INVENTOR
ORVILLE N. HINSVARK

BY McCarthy, Depaoli & O'Brien
ATTORNEYS

United States Patent Office 3,304,170
Patented Feb. 14, 1967

3,304,170
METHOD FOR THERMAL REACTION ANALYSIS
Orville N. Hinsvark, Wilmington, Del., assignor, by mesne assignments, to Hewlett-Packard Company, Palo Alto, Calif., a corporation of California
Filed Dec. 27, 1962, Ser. No. 247,560
15 Claims. (Cl. 75—34)

The present invention relates to a new method and means for thermal reaction analysis. It has particular application to the continuing analysis of reactive gas concentration and/or gas production or consumption during oxidation or reduction operations such as the reduction of metals from their ores and the production of oxidation products of various kinds. While not limited thereto (and the invention is applicable in fact to many materials over wide temperature ranges), it is especially applicable to elevated temperature phenomena. The invention makes it possible to study in detail, at varying temperatures, the chemical reactions and other phenomena taking place in many important industrial operations. The invention is applicable to treatment and study of organic as well as inorganic chemical and physical phenomena. It makes use of the principle of continuously monitoring changes in the composition of a gas stream as a gas reacts with a sample and/or as the sample contributes to detectable changes in concentration of gases or volatile materials, vapors, etc. Meanwhile the temperature of the sample is changed at a programmed and predetermined rate. It has previously been suggested in the art that gas chromatography might be applied to the analysis of certain inorganic reactions, especially some oxidation reactions which take place at moderate temperatures. Gas chromatography can be used in some aspects of this invention. As far as the applicant is aware, however, it has not been suggested before that, for example, a multiple component gas stream might be continuously monitored, while temperature is being changed at a measured or predetermined rate, as a means of obtaining qualitative and quantitative data in detail in such processes as reduction or oxidation of various materials, including such important reactions as the reduction of metals from their oxides or salts, etc. An important object of the present invention is to make such studies possible and practical.

An ancillary object is to provide improved equipment and improved processes for the control of chemical reactions of many important industrial materials including the larger volume ores.

Various known principles of thermal analysis may be applied in this invention, including techniques such as differential thermal analysis, thermal gravimetric analysis, etc. Various detector or sensing devices also may be used.

In a broad sense, the invention comprehends a method and an apparatus for treating a non-gaseous material with a control gas or a reactive gas, wherein the gas is sensed, for comparative purposes before and after making contact with the material, the temperature of the material is varied according to a program and critical temperatures are noted, sensed or recorded as they are indicated by changes in relative concentration of inflowing and outflowing gas. In some cases, there may be no inflowing gas and changes are indicated directly by the concentration, mass or volume of the effluent gas. Instead of gas, the effluent may be a vapor or a volatile liquid.

Making use of such principles and equipment, the present invention more or less continuously measures composition or component concentration in a gas stream as such stream flows over a solid or liquid test sample material whose temperature is being changed at a predetermined and programmed rate. This type of measurement is applicable to any reaction, provided the gas stream changes in composition or concentration because of reaction with the sample, because of decomposition of the sample, or because of other changes such as adsorption, desorption, combinations of these phenomena, etc.

By way of a general example, by continuously monitoring a gas stream containing two or more components, and comparing relative concentration of the components before and after the stream has flowed over a sample of non-gaseous material whose temperature is changing in a controlled manner, a thermogram may be produced. This may be similar to a differential thermogram. By this means, qualitative information is obtained which will aid in identification of the substance or will indicate specific criteria as derived from the temperature at which a known reaction or other chemical phenomenon takes place. At the same time, the quantity of a known gas which is being released or consumed can be measured. Such measurement gives quantitative information as to the amount of a particular material in the solid or liquid sample, as well as the flowing gas. The chemical phenomenon, in broad terms, need not be limited to actual reactions, as it may involve adsorption, desorption and the like.

The invention will be more fully understood by referring in detail to examples, which include specific reduction analyses and other tests. Using hydrogen consumption as an index of the reaction or phenomenon taking place, several inorganic salts, oxides and other materials were studied and analyzed. The results of these studies are indicated in some of the accompanying drawings and in tabulated data included hereinafter. Hence, the invention will be described further in detail and in connection with the drawings wherein.

Figure 1:
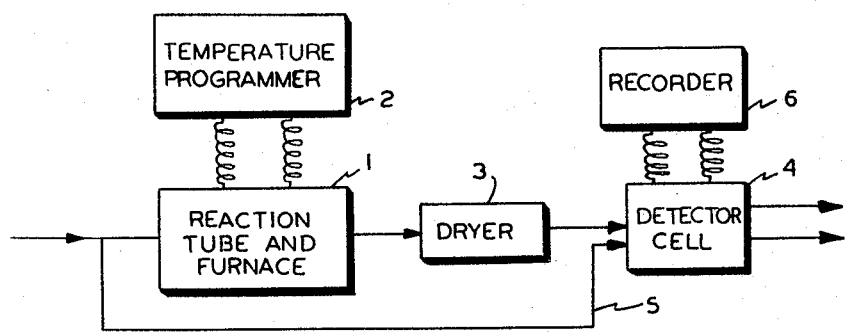
FIG. 1 shows a block diagram of a thermal reduction system for carrying out the procedure of the present invention according to a preferred method.

Referring to the drawings, FIG. 1 shows a system wherein a reaction sample tube is placed in a furnace 1 controlled by a temperature programmer 2. Effluent gas may pass through a dryer 3 which removes moisture, e.g., caused by hydrogen combustion with oxygen. In some cases, the dryer will not be used. It can be by-passed so that the reaction products (e.g., water obtained by reduction of a metal ore with consequent reaction of hydrogen and oxygen) can be run through the detector.

Figure 2:
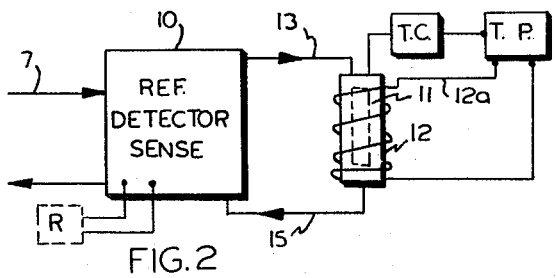
FIG. 2 shows diagrammatically an arrangement for testing a thermal reaction by means of a gas chromatograph.

The gas, dried if desired, goes on to the detector cell 4 where its composition is compared with that of the original gas stream, a portion of which bypasses the reaction tube through a line 5. Composition change is recorded in the recorder 6. Alternatively, the input gas, e.g., a gas mixture, may be passed first through the reference side of a suitable detector, then through the reaction zone, and finally through the sensing side of the detector. See description of FIG. 2 below. In one specific system, a gas mixture containing hydrogen plus some inert gas, such as nitrogen, is used. This mixture, in this particular case, enters the system, FIG. 2, through a line 7. The inert gas should differ sufficiently in thermal conductivity or in some other clearly detectable property, from the reactive gas, e.g., hydrogen, that the change in hydrogen or other reactive gas content of the mixture can be measured with accuracy at the detector as the gas mixture passes over or in contact with the material being tested. This test material sample is placed in a closed tube, such as is indicated at 11, FIG. 2, and controlled and programmed heat is applied. The tube 11 is enclosed in a furnace or oven 12. Oven 12 is heated by suitable means 12a, shown as a heating coil. Power is applied to heating means 12a through suitable leads under control of thermocouple TC and a temperature programmer TP.

The gas is passed continuously through the sample tube 11 by means of lines 13, 15, while the tube is being heated. Before going through the sample tube 11, the gas, e.g., a mixture of hydrogen and nitrogen, passes through the reference side of the detector 10. Detector 10 may be of any suitable type. It is shown here as a thermal conductivity detector. This detector instrument is of more or less conventional type and hence is not shown or described in detail.

After passage through the reference side of detector 10, the gas to be analyzed goes through line 13, through the sample tube 11, and thence through return line 15 to the sensing side of detector 10. The change in gas composition is noted by the detector and may be permanently recorded when desired. The detector is, of course, mounted outside of the oven or furnace. The temperature, which is being changed by the programmer, is recorded for each significant change in concentration of the pertinent gas indicated by the detector. In this case, the pertinent gas is hydrogen.

Assuming a known ratio of reactive gas to inert, e.g., of hydrogen to nitrogen, in the stream entering the system, these concentrations may be indicated respectively by $H_2'$ and $N_2'$. If the effluent gas is denoted by $H_2''$ and $N_2''$, respectively, then when no reaction is taking place within the sample tube, $H_2'=H_2''$ and $N_2'=N_2''$. Meanwhile, the temperature of the furnace or oven is being changed, e.g., increased (under control of the temperature programmer, FIG. 1) and as soon as a reaction temperature is reached, there will be a change in hydrogen or reactive gas content of the effluent gas, line 15. Assuming that a reduction is taken place (e.g. of a metal oxide or salt) the hydrogen content $H_2''$ becomes less than $H_2'$. Correspondingly, the proportionate nitrogen content of the effluent gas increases, that is, $N_2''$ becomes greater than $N_2'$. With an accurate detector, such as that commonly used in gas chromatography, the threshold reduction temperature can be accurately determined. Likewise, the temperature at which the reduction or reaction rate is greatest can be determined with accuracy. Also, the point at which the reaction is completed may be determined timewise, temperature-wise, or both. $H_2'$ and $H_2''$ of course become equal again when the reaction has ended.

The hydrogen may be omitted in the case of a decomposition reaction. The products of decomposition then may be swept out by an inert carrier gas, accurately identified, and the critical or pertinent temperatures of incipient decomposition, maximum decomposition, completion of decomposition, etc., may be ascertained. Temperature programming is usually on an increasing gradient but may be decreasing or may be alternately increasing and decreasing, depending on the criteria to be studied or the material being then treated, the process to be carried out, the gaseous component or components, etc.

The system and procedure of this invention may also be used to study the corrosion, hydrogen embrittlement, etc. of metals. It is applicable also to the identification and measurement of salts or oxides found or formed in contact with metal. It is particularly applicable to studies of adsorption and desorption phenomena and the like.

The same technique may be employed with other reactive and inert gas mixtures than hydrogen and/or nitrogen. Thus, a mixture of a halogen, such as chlorine or bromine, with a carrier gas such as helium, may be used to ascertain the optimum temperature for halogenation of various materials, organic and inorganic. A mixture of helium and oxygen may be used to determined optimum temperature and/or end point temperatures for oxidation reactions.

Reactions of materials which produce gaseous by-products though not themselves gaseous, can also be studied. Examples are the reduction of metal oxides with carbon, the calcination of carbonate, etc.

Figure 3:
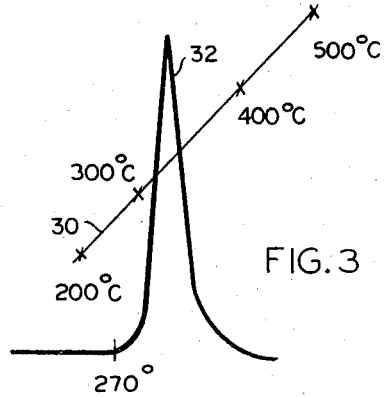
FIG. 3 is a typical hydrogen reduction thermogram of nickel oxide.

Referring further to the drawings, FIG. 3 shows a typical reduction thermogram in which the detector output signal amplitude and reaction tube temperature, respectively, are plotted as the ordinant against time as the abscissa for nickel oxide. In the experiment, a 50% $N_2$-50% $H_2$ (by volume) gas mixture was passed through the sample tube at the rate of 50 ml. per minute. The tube contained 2.183 milligrams of nickel oxide (U.S. Bureau of Standards). The temperature of the sample was raised progressively from 200° C. to 500° C. at a uniform rate of about 30° C. per minute as denoted by the line 30. Incipient reaction, as shown on the graph by the line 32 representing detector output signal amplitude, began at 270° C.; a maximum rate was reached at about 320° C.

Figure 4:
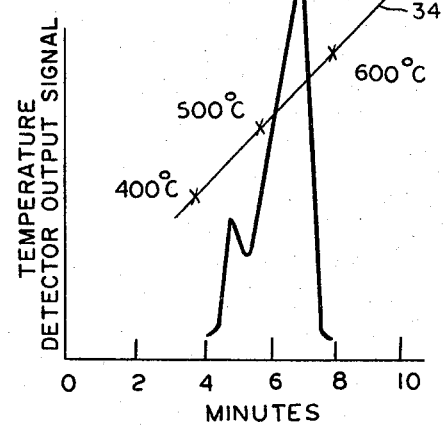
FIG. 4 is a reduction thermogram of iron oxides.

FIG. 4 shows a similar thermogram to that illustrated in FIG. 3 in which the detector output signal amplitude and reaction tube temperature, respectively, are plotted as the ordinants against time as the abcissa. In FIG. 4 the thermogram is for reduction of iron oxide with hydrogen with reaction tube temperature denoted by the line 34 and detector output signal amplitude denoted by the line 36. The iron oxide was produced by calcination of C.P. ferric nitrate at a temperature of 520° C. for 120 hours. The oxide was considered chemically pure. The same gas mixture was used as in FIG. 3 and reduction began at about 400° C. after 4 minutes. A first peak was reached at 435° C. The reaction then receded somewhat and then accelerated dramatically to reach a maximum rate at about 560° C. The first reaction was the reduction to the magnetite state:

(1) 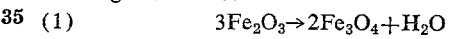
$$3Fe_2O_3 \rightarrow 2Fe_3O_4 + H_2O$$

and the second reaction went all the way to pure iron:

(2) 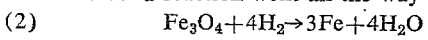
$$Fe_3O_4 + 4H_2 \rightarrow 3Fe + 4H_2O$$

Figure 5:
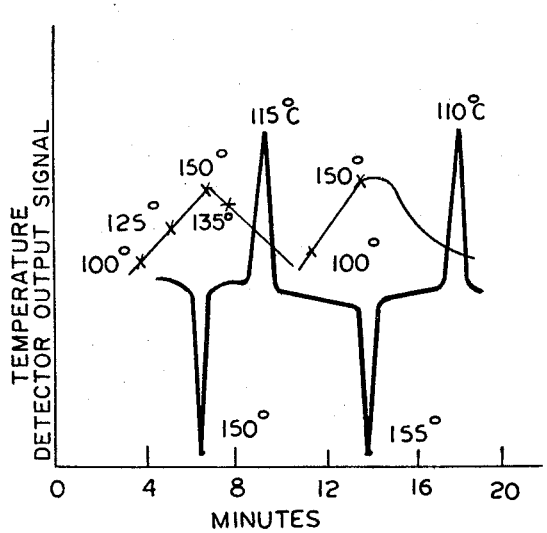
FIG. 5 shows adsorption-desorption of hydrogen by palladium.

FIG. 5 shows alternate desorption-adsorption thermogram cycles for palladium, taking up and giving off adsorbed (or combined) hydrogen gas from a 50–50 volume mixture of nitrogen and hydrogen. In FIG. 5 the same ordinants and abcissa as used in FIGS. 3 and 4 are employed. The palladium was obtained by reduction of $PdCl_2$. Starting off at a temperature of about 100° C., hydrogen was desorbed as the temperature was increased uniformly at the rate of about 25° per minute, then was decreased, again increased, etc. 4.469 mg. of 60% palladium, calculated as $PdCl_2$ (0.0251 milli-mole of Pd) adsorbed 0.0065 milli-mole of gaseous hydrogen. (These concentrations corresponded quite closely to previously known ratios of Pd and $H_2$ as in $Pd_2H_2$ suggesting the possible presence of such compound). Peak desorption occurred at about 150° C. (155° C. in the second case) and adsorption was a maximum at 110 to 115° C.

The example just given illustrates another use of the method of this invention. It will be apparent to those skilled in the art that by combining temperature gradient control with the use of the detector, much useful information may be obtained with an accuracy hitherto not feasible.

A number of experiments indicated that critical temperature phenomena, for example, can be accurately determined. The reproducibility of reduction temperature for nickel oxide (with hydrogen) is indicated in Table I, five tests being made on each sample.

TABLE I

*Reduction temperature, ° C.*

| U.S. Bureau of Standards nickel oxide: | "Reagent Grade" $Ni(NO_3)_2 \cdot 6N_2O$ |
|---|---|
| 300 | 310 |
| 305 | 312 |
| 295 | 308 |
| 300 | 305 |
| 300 | 310 |

Qualitatively, the method of this invention can be employed to characterized metal salts, such as nitrates and chlorides which are known to reduce at different temperatures. Where reduction is stepwise, this becomes apparent too.

Quantitatively, the invention is useful also. For example, by reducing a known metal oxide with hydrogen, and measuring the hydrogen consumption, this consumption can be related to hydrogen consumption of an unknown sample to measure the amount of the oxidized material in the sample. This procedure was employed in connection with several metal oxides produced for test purposes by oxidizing the pure metals and then determining their quantities by hydrogen reduction and measuring the hydrogen consumption, using the detection method and means of this invention. The data collected is shown in Table II:

TABLE II

| Sample | Temp., ° C., Treatment | Percent Oxidized Calculated | Percent Measured by this process |
| --- | --- | --- | --- |
| Co-CoO | 350 | 6.07 | 5.98 |
| Co-CoO | 500 | 16.80 | 16.30 |
| Co-CoO | 630 | 47.30 | 47.70 |
| Ni-NiO | 350 | 1.96 | 1.88 |
| Ni-NiO | 500 | 6.68 | 7.10 |
| Cu-CuO | 630 | 96.60 | 91.40 |
| NiCl$_2$ | 325 | 100.00 | 97.30 |
| CoCl$_2$ | 325 | 100.00 | 91.80 |

The hydroscopic nature of the chlorides probably accounts for the lower observed values of the nickel and cobalt salts.

The invention is applicable over wide temperature ranges and apparently the only high temperature limitations are those imposed by materials of construction. By using stainless steel or other high temperature materials, determination may be made at temperatures above 1000° C.

It will be evident that the process and equipment have wide applications for scientific study as well as for practical use in important and large scale commercial processes. Adaptations to various uses, by making use of suitably selected detectors, sensing means, ovens, controllers, carrier gases, and materials of construction give the system broad versatility. Many modifications will suggest themselves to those skilled in the art and will still come within the spirit and purpose of the invention.

Other uses and applications of the invention, in addition to those specifically mentioned above, will suggest themselves to those skilled in the art. These include such studies as determination of surface areas, porosity and related characteristics of solids; also catalytic activity and the like. Generation of gases, consumption by reaction, adsorption and desorption, etc., may readily be related to the composition changes in inflowing and effluent gases, vapors, etc.

Obvious variations and modifications such as those which readily occur to those skilled in the art are intended to be covered by the following claims, as far as the state of the art permits.

What is claimed is:

1. The method of determining incipient and optimum reaction temperatures of test materials in contact with a chemically reactive gas, which comprises progressively changing the temperature of said materials in accordance with a known function of time while continuously passing a mixture of known constant constituency of said reactive gas and an inert carrier gas of different thermal conductivity from said reactive gas through a reference gas thermal conductivity detector, then into contact with said test material, and finally through an effluent gas thermal conductivity detector, and sensing and recording the temperature points at which significant changes in concentration of said effluent reactive gas relative to said inert carrier gas occur.

2. Method according to claim 1 wherein the reaction involves reduction of an oxidized metal.

3. Method according to claim 1 wherein the reaction is an oxidation reaction.

4. The method of analyzing a material which comprises subjecting said material to a known variation in temperature as a function of time, exposing said material while undergoing said temperature variations to the continuous flow of a mixture of gases having a known constituency, at least one of said gases being reactive with said material, and sensing the changes that occur in the constituency of said mixture as a function of temperature.

5. The method of analyzing materials in a closed chamber which comprises varying the temperature of said chamber as a known function of time, continuously passing a gas mixture through said chamber during said temperature variations, said mixture being of known and constant constituency, one of said gases being more reactive with said material than the other one of said gases, sensing the constituency of said gas mixture prior to passage through said chamber, sensing the constituency of said gas mixture after passage through said chamber, and comparing the constituency of said gas mixture before and after passage through said chamber as a function of said temperature variations thereby to determine significant temperatures which are indicative of the characteristics of the materials being analyzed.

6. The method according to claim 5 wherein said fluid mixtures comprises hydrogen gas and nitrogen gas and said material comprises a metal oxide ore to be reduced, said method including the additional step of selecting said known function of time to be a constant at that temperature where the ratio of hydrogen gas to nitrogen gas is at a minimum.

7. A method of analyzing a material which comprises:
continuously varying the temperature of a sample of said material in accordance with a known function of time,
simultaneously therewith continuously passing a stream of a gaseous mixture of known and constant composition consisting of a first gas that is reactive with said material and a second gas that is less reactive than said first gas with said material over and in contact with said sample while undergoing said temperature variations,
sensing changes in the constituency of said gaseous mixture that occur throughout said temperature variation after contacting said sample,
said changes indicating the temperature at which a significant change in the constituency of said gaseous mixture occurs.

8. The method according to claim 7 further characterized in that said first gas of said mixture is selected to be chemically reactive with said material.

9. The method according to claim 7 further characterized by the additional step of integrating with respect to time sensed changes in constituency of said gaseous mixture, thereby to obtain information indicative of the quantity of said sample that reacts with said first gas.

10. The method according to claim 8 further characterized by the additional step of integrating with respect to the time sensed changes in constituency of said gaseous mixture, thereby to obtain information indicative of the quantity of said sample that reacts with said first gas, said sample being of known weight thereby to determine the quantity of material in said sample.

11. The method according to claim 8 further characterized in that said second gas is chemically inert and substantially non-reactive with said material.

12. The method according to claim 11 further characterized in that said first gas is a reducing gas.

13. The method according to claim 11 further characterized in that said first gas is an oxidizing gas.

14. The method according to claim 11 further characterized by the additional step of integrating with respect to time the sensed changes in constituency of said gaseous mixture, thereby to obtain information indicative of the quantity of said sample that reacts with said first gas.

15. The method according to claim 14 further characterized in that said first and second gases have different thermal conductivities and that said sensing is by measuring the difference in thermal conductivity of the gas stream due to reactions occurring as a function of programmed temperature variations of said sample.

References Cited by the Examiner
UNITED STATES PATENTS

| | | | |
|---|---|---|---|
| 2,418,148 | 4/1947 | Williams | 75—91 |
| 2,790,710 | 4/1957 | Cavanagh | 75—34 |
| 2,905,536 | 9/1959 | Emmett et al. | 23—232 |
| 2,960,870 | 11/1960 | Nelsen et al. | 73—432 |

OTHER REFERENCES

Articles:
Sullivan et al.: Published in Analytical Chemistry, volume 31, No. 11, November 1959, pages 1826–1828.
Daeschner et al.: Article in Analytical Chemistry, vol. 34, No. 9, August 1962, pages 1150–1155.
Dal Nogare et al.: Published in Analytical Chemistry, vol. 31, No. 11, November 1959, pages 1829–1832.
Drew et al.: Published in Vapor Phase Chromatography, by Desty (Butterworths Scientific Publications, London), 1956, pp. 213 to 220.

DAVID L. RECK, *Primary Examiner.*

W. C. TOWNSEND, H. W. TARRING,
*Assistant Examiners.*